March 10, 1964 B. COE 3,123,870
DOOR-ACTUATED THRESHOLD SEAL
Filed March 2, 1962 2 Sheets-Sheet 1
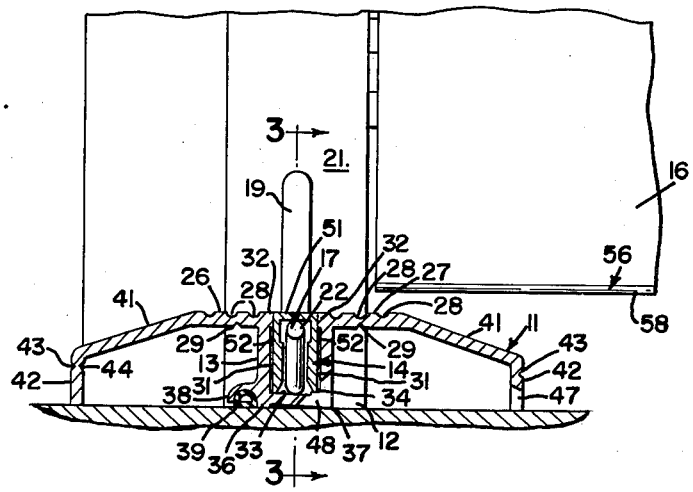
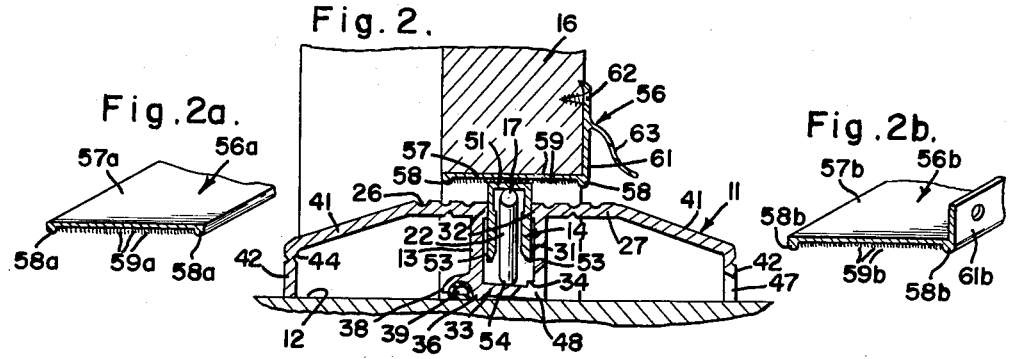
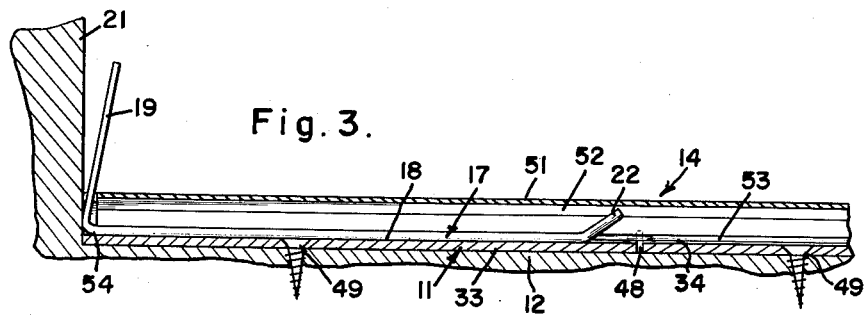
INVENTOR.
Benjamin Coe
BY
Julian Caplan
attorney March 10, 1964  B. COE  3,123,870
DOOR-ACTUATED THRESHOLD SEAL
Filed March 2, 1962  2 Sheets-Sheet 2
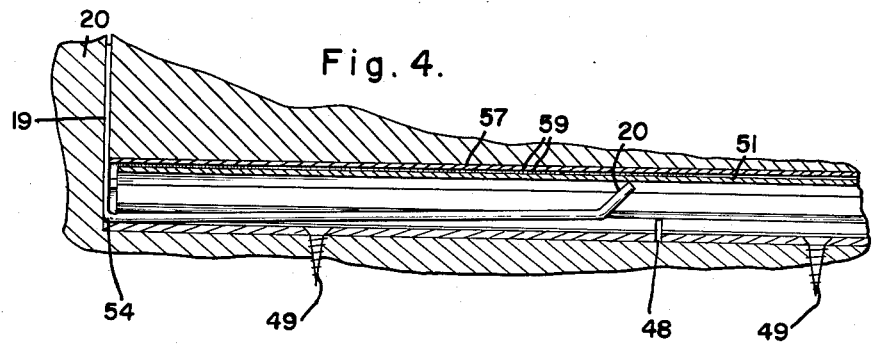
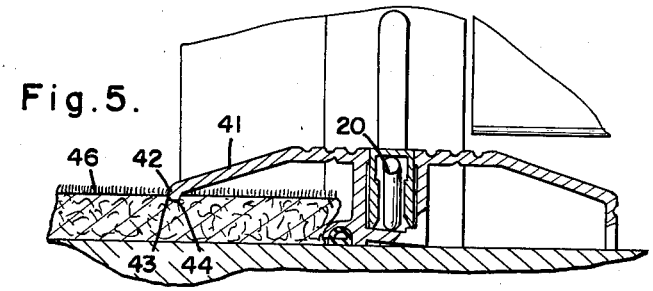
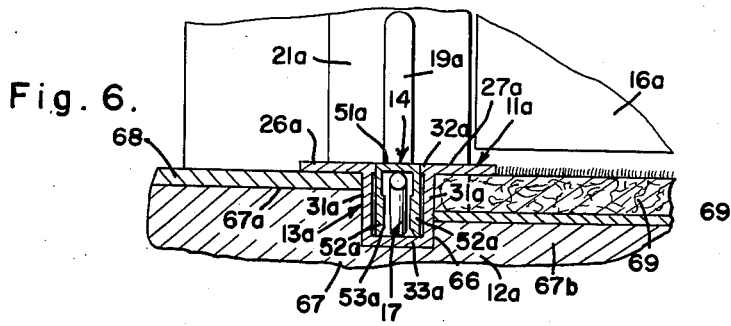
INVENTOR.
Benjamin Coe
BY
Julian Caplan
attorney United States Patent Office 3,123,870
Patented Mar. 10, 1964

3,123,870
DOOR-ACTUATED THRESHOLD SEAL
Benjamin Coe, Portola Valley, Calif., assignor to Woodside Industries, Inc., Redwood City, Calif.
Filed Mar. 2, 1962, Ser. No. 177,013
11 Claims. (Cl. 20—64)

This invention relates to a new and improved door-actuated threshold seal.

Reference is made to Patent No. 2,829,405 on which the present application is an improvement. The improvement of the present invention relates to construction of parts of the threshold seal as hereinafter described.

A still further improvement of the present invention resides in the construction of the lifting lever which is interposed between the door and the door jamb so that the outer end of the lever is lifted when the door is closed, the lifting of the lever raising the seal bar against the underside of the door.

A principal advantage of the present invention is that the lifting lever for the seal bar which fits in the threshold is made of spring steel wire, so formed that the force imposed on the lever is distributed throughout the entire length of the horizontal portion of the lever rather than localized at the point where the vertical portion and the horizontal portion meet. This virtually eliminates the tendency to fracture. It simplifies the construction of the lever and, because of its symmetry in the vertical plane, eliminates the necessity of broaching non-symmetrical grooves in the end of the threshold, making a standard threshold adaptable for either right-hand or left-hand opening doors.

One important feature of the present invention relates to the construction of the threshold itself. Frequently, thresholds are installed in locations where carpeting abuts the door opening. The threshold of the present invention is intentionally weakened along one of the legs in such manner that the leg may be broken off so that the edge of the carpet will fit under the threshold and be secured thereby with the edge of the carpet protected against wear.

Another feature of the invention is the provision of weep holes along the outside of the threshold and, also, along the outer edge of the channel in which the seal bar is received so constructed that moisture tending to collect in the channel or under the threshold drains to the outside.

Still another feature of the invention is the fact that the bottom of the channel slants outwardly to facilitate drainage, but at the same time a step is formed in the bottom of the channel along the outer edge which supports one edge of the seal bar at the same level as the other edge and maintains the bar in substantially vertical alignment.

Other features of the invention relate to the interrelationship of the seal bar and channel of the threshold so that the entrance of dirt, and the like, under the seal bar and into the channel is impeded, but if dirt does enter this location it is directed in such manner that it does not interfere with the efficient operation of the device.

An alternate feature of the invention is the provision for a "straight-edge" seal on the underside of the door which co-operates with the seal bar to effect a weather tight seal when the door is closed. The under surface of the door seal is preferably provided with flocking or similar material which bears against the seal bar when it is raised to the closed position, thus furnishing a seat for the raised seal bar to effect an air tight and moisture-proof seal. As an alternate construction of the "straight-edge" seal, it is made with a vertical section attached to the horizontal portion, pierced with screw-holes at intervals along the vertical portion to permit installation, with screws, without removing the door in the process. Still another alternate form of construction adds a drip guard protruding in cross-section from the vertical face, installed on the outer surface of the door. Such a drip guard extends outwardly-downwardly and directs moisture running down the outside of the door away from the threshold, thereby reducing the opportunity for moisture to enter through the seal. The "straight-edge" seal and its alternates eliminate the necessity for planing, filing, sawing or otherwise working on the under-edge of the door for the purpose of producing a true "straight-edge" point of contact between the door bottom and the seal bar.

Still another alternate form to the present invention permits its adaptation to interior construction. By elimination of the ramp portions of the main threshold cross-section, the threshold may be installed in a virtually flush position with relation to the floor, with the channel containing the seal bar inserted in a groove in the flooring and the horizontal portion flush with the floor. Thus, when the door is open the threshold and seal bar are flush with the floor. With the door closed the seal bar rises flush with the door bottom, sealing out transmission of noise, cold, heat, drafts, light, odors, the ingress and egress of insects and rodents from adjoining rooms. The elimination of noise transmission is particularly important as an added means of insuring sound proofing of rooms. The elimination of drafts under the door is particularly important with relation to heat control of individual rooms, and the sealing off of air transmission in otherwise fire resistant walls.

Other objects of the present invention will become apparent upon reading the following specification and referring to the accompanying drawings in which similar characters of reference represent corresponding parts in each of the several views.

In the drawings:

FIG. 1 is a transverse vertical sectional view through the threshold installed in an exterior location and showing the door in open position.

FIG. 2 is a view similar to FIG. 1, showing the door in closed position.

FIGS. 2–A and 2–B are fragmentary perspective views of modified straight edge devices.

FIG. 3 is a longitudinal vertical sectional view taken substantially along the line 3—3 of FIG. 1, showing the door in open position.

FIG. 4 is a view similar to FIG. 3, showing the door in closed position.

FIG. 5 is a view similar to FIG. 1, illustrating the use of the device in installations where carpeting abuts the door opening and showing one leg of the threshold removed to receive said carpeting.

FIG. 6 is a view similar to FIG. 1 of a still further modification showing the device installed in an interior location.

The general principles of operation of the present device are described in said Patent No. 2,829,405. In essence, a threshold 11 is installed across a door opening 12, said threshold being provided with a channel 13. A seal bar 14 is vertically movable in the channel. In retracted position, when door 16 is open, seal bar 14 is retracted in the channel so that its upper edge coincides with the exposed upper edge of the threshold. When the door 16 is closed, the seal bar 14 is raised partially upwardly out of the channel to engage the bottom edge of door 16. The means for raising bar 14 is a lift lever 17 which in side elevation is L-shaped, the two legs 18, 19 of the lever being disposed at angles of somewhat less than 90°. The short end 19 of the lever is located in door opening 12 so that it is pinched between the edge of door 16 and the jamb 21 when the door is closed. Since the lever 17 is less than 90°, its outer tip 22 is raised and engages under seal bar 14 and effects the raising thereof.

The threshold 11, which is the subject of this invention, has inner and outer substantially horizontal flanges or stretches 26, 27 which are provided with longitudinal grooves 28 to form treads which reduce slippage. The underside of each horizontal flange 26, 27 is formed with a longitudinal groove 29 which permits flexing of the threshold. It will be understood that sometimes the surface 12 on which threshold 11 is installed is not entirely smooth and regular. The grooves 29 permit the threshold to flex to accommodate such irregularities when the threshold is screwed into the sub-floor. The channel 13, which is recessed below the two horizontal flanges 26, 27, has substantially vertical side walls 31. At the juncture of the upper edges of side walls 31 and the horizontal flanges 26, 27 lips 32 are formed projecting inwardly and coming close to the abutting surfaces of seal bar 14. Lips 32 prevent the entry of dirt and other undesirable substances inside channel 13. However, it will be noted that the space between walls 31 of channel 13 and seal bar 14 widen out below lips 32 permitting any such foreign substances which do happen to enter to drop to the bottom of channel 13 where they are less likely to interfere with operation of the device. The bottom surface 33 of the channel slants downwardly-outwardly so that any moisture which enters the channel drains to the right as viewed in FIG. 1. However, in order to maintain the seal bar 14 in upright position and prevent it tilting at the angle of bottom 33, a step 34 is built along the outer edge of bottom 33 of channel 13, the height of step 34 accommodating the slope or pitch of bottom 33 thereby maintaining seal bar 14 vertical. The underside of the inner edge of bottom 33 is formed with a thin leg 36 which cooperates with the outer corner 37 of bottom 33 to maintain channel 13 vertical. A curved lateral extension 38 is provided along the exterior surface of the inner wall 31 which extension 38 has an arcuate recess slightly exceeding a semi-circle in cross section to receive and hold a length of plastic tubing 39 which is compressed against the floor 12 and seals threshold 11 to the floor.

Threshold 11 is formed with downwardly-outwardly slanting ramps 41 beyond horizontal flanges 26, 27, said ramps 41 being disposed at an angle preferably of approximately 18°. Vertical legs 42 depend from ramps 41, the bottom edges of legs 42 being level with the bottom of channel 13. Longitudinal notches 43 are formed on the outer surfaces of legs 42. An important feature of the present invention is the provision of a longitudinal notch 44 or groove on the interior of interior leg 42 which groove 44 is approximately opposite groove 43. The function of groove 44 is illustrated in FIG. 5. By reason of the fact that leg 42 is weak in the area between notches 43 and 44, it may readily be broken by the installer along this zone. When so broken the edge of carpeting 46 may be inserted under threshold 11, the threshold thereby serving to protect and secure the edge of carpet 69 where it adjoins the threshold, and also eliminating the need of cutting the carpet to accommodate the inner edge of the threshold.

To permit drainage of any moisture which may collect in channel 13 or under the threshold, weep notches are formed. One of the features of the present invention is the construction of such weep notches. Thus, it will be seen that at intervals of approximately 14 inches along the length of threshold 11 saw cuts are formed. A single cut of a 4-inch saw blade will form a weep slot 47 in the bottom of the outer leg 42 of the threshold and also a slot 48 in the corner where the outer vertical wall 31 and bottom 33 of channel 13 adjoin. Hence, the necessary weep slots 47, 48 for the channel and for the threshold legs 42 may be made rapidly and economically. It will also be understood that countersunk holes are formed in bottom 33 of the channel for the installation at intervals of screws 49 which are used to secure the threshold to floor 12.

The seal bar 14, which is the subject of this invention, has the cross-section of an inverted U with a flat top 51 and vertical outer walls 52. The outer wall surfaces 52 fit between lips 32 of the threshold sufficiently tightly so that ingress of foreign substances is impeded. However, it will be noted that the bottom edges of sides 52 of the seal bar are formed with bevels 53 so that if any foreign material falls to the bottom 33 of the channel, the beveled edges 53 will direct the same toward the center where it will not interfere with proper seating of the seal bar or lifting and retraction thereof.

The lift lever 17, which is used in connection with this invention, is preferably formed of round spring steel and is of a length less than one-half than that of the threshold. At one end 19 the lever is bent upwardly at an angle of approximately 80° with respect to the main portion 18 thereof and this upwardly bent leg 19 is preferably flattened. The outer end or tip 22 of the lift lever is bent upwardly so that it engages the underside of the top 51 of seal bar 14. When door 16 is closed, it pinches against the leg 19 of the lift lever 17 and forces it back, the corner 54 at which the leg 19 and the main portion 18 of the lever meet acting as a fulcrum for tipping of the lever. Such tipping causes the seal bar 14 to be lifted from the retracted position of FIG. 1 to the elevated position of FIG. 2, so that it engages the underside of door 16. The seal bar is lifted first on the hinged side of the door. When this end contacts the bottom of the door, then further pressure of the lever raises the far end of the seal bar so that the entire length of the seal bar contacts the door. This feature provides for automatic self adjustment for sag or swelling of the door during its entire life. Seal bar 14 is slightly shorter than threshold 11 to permit the lift lever end 19 to protrude to a location between the door frame 21 and the position of the door 16 when in closed position. By making seal bar 14 slightly shorter than threshold 11, no fabricating operation is required with respect to the threshold 11 to permit extension of leg 19 and this enables the threshold to be used either with left-hand opening or right-hand opening doors without fabricating operations being performed thereon. At the same time, the leg 19 seals the space between the end of seal bar 14 and the door frame 21. A feature of the lever construction is the fact that the stress imposed upon the lever leg 18 is along its entire horizontal length rather than at corner 54. Further, the construction of the lever 17 of spring steel further reduces the likelihood of breakage of the lever at any point.

A "straight edge" or door seal 56 may be used in cooperation with seal bar 14 to effect an air-tight and water-tight seal and further to reduce wear on the underside of the door. Such an edge in the form shown in FIG. 2 has a bottom flange 57 which underlies the bottom edge of the door. The corner longitudinal edges of the bottom flange are formed with slight bulbs 58 to reinforce the same and provide for wear. The bottom surface of flange 57 is preferably provided with flocking 59 or a felt material suitably adhered thereto. Such flocking 59 helps to seal any spaces between the seal bar 14 and the bottom of the door 16 which may be occasioned by irregularities in the contact between the seal bar and the door. An important feature of construction is that bottom flange 57 evens out any imperfections or irregularities on the bottom surface of the door, a condition of importance with old doors. Thus, considerable labor in preparing the door for use with the threshold is avoided. A vertical flange 61 may be formed on the outside which overlies the bottom of the outside of the door. Screws 62 hold the flange on the door. In use, the flocking 59 immediately above seal bar 14 and inwardly thereof tends to wear by reason of rubbing action of the seal bar. However, the flocking exteriorly of seal bar 14 is not worn by such rubbing action and remains in its original condition. Hence, even with the passage of time the outer portion of flocking 59 performs its sealing function.

A drip shield may further be provided on vertical flange 61. Such a shield 63 as shown in FIG. 2 curves downwardly-outwardly to a tip in fairly close proximity to threshold 11. Any water which tends to run down the outside face on door 16 is directed by shield 63 away from channel 13 so that it runs down ramp 41. Accordingly, the door seal 56 cooperates with seal bar 14 of the threshold to effect a better barrier against air and moisture.

In FIG. 2A, vertical flange 61 and shield 63 are eliminated and various means may be used to secure bottom flange 57a in place. FIG. 2B shows use of vertical flange 61b, but eliminates the drip shield.

Directing attention now to FIG. 6, there the device is shown in modified form installed in an interior location. Thus, a groove 66 is formed in the sub-flooring 67 at the door opening and groove 66 receives channel 13a. The horizontal flanges 26a are flush with the exposed floor covering surface. On the inside of the door opening there may be, as a typical example, a sub-flooring 67a which carries vinyl tile 68, or the like, such as might be installed in a bathroom. On the outside of the door the sub-flooring 67b (here shown at a lower elevation, although this is not an essential feature) carries carpeting 69. The threshold 11a is formed with horizontal flanges 26a, 27a extending toward the interior and the exterior of the door opening, respectively, and overlie the vinyl tile 68 or the edge of the carpeting 69 which abuts the threshold, as the case may be. The ramps 41 and legs 42 shown in the preceding modifications are eliminated in this construction. The channel portion 13a is essentially the same as in FIGS. 1 to 5, except that the extension 38 for the sealing tubing is not necessary in interior construction and may be eliminated. Further, the tipping of the bottom 33 of the channel for drainage purposes is not essential in interior construction. In other respects, the seal bar and lifting lever are essentially the same and corresponding parts are designated by the same reference numeral followed by the subscript a. The form of the invention shown in FIG. 6 permits installation between two rooms and forms a barrier against noise, cold, heat, drafts, light, odor, and the ingress and egress of insects and rodents. Inasmuch as it is common practice to install a metal protective strip along the edges of vinyl tile flooring and carpeting at a door opening, the present invention performs such function as well as performing the sealing function hereinbefore described.

Although the foregoing invention has been described in some detail, by way of illustration and example for purposes of clarity of understanding it is understood that certain changes and modifications may be practiced within the spirit of the invention and scope of the appended claims.

What is claimed is:

1. In a threshold of the character described, means defining a channel having substantially vertical longitudinally extending walls, means for sealing one said wall against outside weather, a bottom connecting the lower ends of said walls, said bottom sloping toward the other said wall, a step protruding along said bottom alongside said other wall, said step having a height substantially equal to the pitch of said bottom, and support means connected to the upper ends of said walls supporting said first mentioned means erect.

2. A threshold according to claim 1, in which said second-mentioned means comprises socket-forming means located immediately adjacent said channel to receive a portion of a tube positioned longitudinally of said threshold and a resilient tube within said socket, said tube compressing and sealing against a surface to which said bottom is secured.

3. A threshold according to claim 1, which said support means comprises substantially horizontal stretches extending outward from said upper ends of said walls, downward-outward ramps at the outer edges of said horizontal stretches, and vertical legs on opposite sides of said threshold depending from the outer edges of said ramps, at least one said leg being formed with a longitudinally extending groove weakening said one leg, whereby said leg may be broken off along said groove and the edge of carpeting slipped under said threshold.

4. A threshold according to claim 1, in which said support means comprises horizontal flanges extending transversely outwardly from the upper edges of said walls, downwardly-outwardly sloping ramps extending outwardly from the outer edges of said horizontal flanges, and vertical legs along the outer edges of said ramps, the lower edges of said legs being approximately at the same level as the bottom edge of said bottom, each said horizontal flange formed with a longitudinal groove, whereby said flange may flex to accommodate unevenness in the underlying surface to which said threshold is attached.

5. A threshold according to claim 1, which further comprises within said channel having substantially parallel outside surfaces and a seal bar carried within said channel and lips on the upper edges of said walls, each said lip comprising an integral protuberance projecting inwardly of said channel at the top of said channel to close off any gap between said walls and said outside surfaces.

6. In combination, a threshold comprising means defining a channel having substantially vertical, longitudinally-extending walls, a bottom interconnecting the lower edges of said walls, and support means connected to the upper ends of said walls supporting said threshold upright, a seal bar vertically reciprocable in said channel and having the shape of an inverted U in cross-section, said seal bar having substantially parallel outside surfaces at its maximum width substantially narrower than the width of said channel, said seal bar having depending legs and a transverse cross-piece connecting the upper ends of said legs, the upper edges of said walls being formed with inwardly protruding lips closing off any gap between said outside surfaces of said seal bar and said walls, and a lift lever formed of resilient round spring material and having a horizontal portion resting on said bottom, an upwardly slanted tip at the outer end of said horizontal portion extending between the legs of said seal bar and engaging the underside of the cross-piece of said seal bar, and an upward projecting flattened trigger at its inner end projecting up above said threshold, said trigger being disposed at an angle of slightly less than 90° with respect to said horizontal portion.

7. The combination of claim 6, in which the bottom edges of said legs are upwardly-inwardly beveled.

8. A threshold according to claim 6, in which further comprises socket-forming means along one said longitudinally-extending wall shaped to form a socket to receive a portion of a tube positioned longitudinally of said threshold, and a resilient tube within said socket, said tube compressing and sealing against a surface to which said bottom is secured.

9. In combination, a threshold comprising means defining a channel having substantially vertical, longitudinally-extending walls, a bottom interconnecting the lower edges of said walls, and support means connected to the upper ends of said walls supporting said threshold upright, a seal bar vertically reciprocable in said channel and having depending legs and a transverse cross-piece connecting said legs above their lower edges, a lift lever formed of resilient spring material having a horizontal portion resting on said bottom, a tip at the outer end of said horizontal portion extending between the legs of said seal bar and engageable with the underside of the cross-piece of said seal bar, and an upward projecting trigger at its inner end projecting up above said threshold, said trigger being disposed at an angle of slightly less than 90° with respect to said horizontal portion, a door, means supporting said door for hinged movement adjacent said threshold, a door seal having a horizontal flange along the bottom of said door and a vertical flange along the lower edge of one face of said door, and flocking on the lower surface of said horizontal flange, said seal bar being raised by said lift lever when said door is closed into tight fit against said flocking.

10. The combination of claim 9, which further comprises a downwardly-outwardly slanted drip guard extending from said vertical flange, said guard diverting water running down said face away from said channel.

11. In combination, a threshold comprising means defining a channel having substantially vertical, longitudinally-extending walls, a bottom interconnecting the lower edges of said walls, and support means connected to the upper ends of said walls supporting said threshold upright, a seal bar vertically reciprocable in said channel and having depending legs and a transverse cross-piece connecting said legs above their lower edges, said seal bar having substantially parallel outside surfaces at its maximum width substantially narrower than the width of said channel, the upper edges of said walls being formed with inwardly protruding lips closing off any gap between said outside surfaces of said seal bar and said walls, and a lift lever formed of resilient spring material and having a horizontal portion resting on said bottom, a tip at the outer end of said horizontal portion extending between the legs of said seal bar and engageable with the underside of the cross-piece of said seal bar, and an upwardly projecting flattened trigger at its inner end projecting up above said threshold, said trigger being disposed at an angle of slightly less than 90° with respect to said horizontal portion.

References Cited in the file of this patent
UNITED STATES PATENTS

| | | |
|---|---|---|
| 974,706 | Penny | Nov. 1, 1910 |
| 1,867,010 | Kampes | July 12, 1932 |
| 2,129,381 | Oftedal et al. | Sept. 6, 1938 |
| 2,629,143 | Spector et al. | Feb. 24, 1953 |
| 2,829,405 | Huff | Apr. 8, 1958 |
| 2,933,781 | Cornell | Apr. 26, 1960 |
| 3,061,896 | Wahlfeld | Nov. 6, 1962 |